Nov. 14, 1950 — G. H. F. KNIGHT — 2,529,614
POWER-DRIVEN AGRICULTURAL AND LIKE IMPLEMENTS
Filed Oct. 21, 1947 — 3 Sheets-Sheet 1
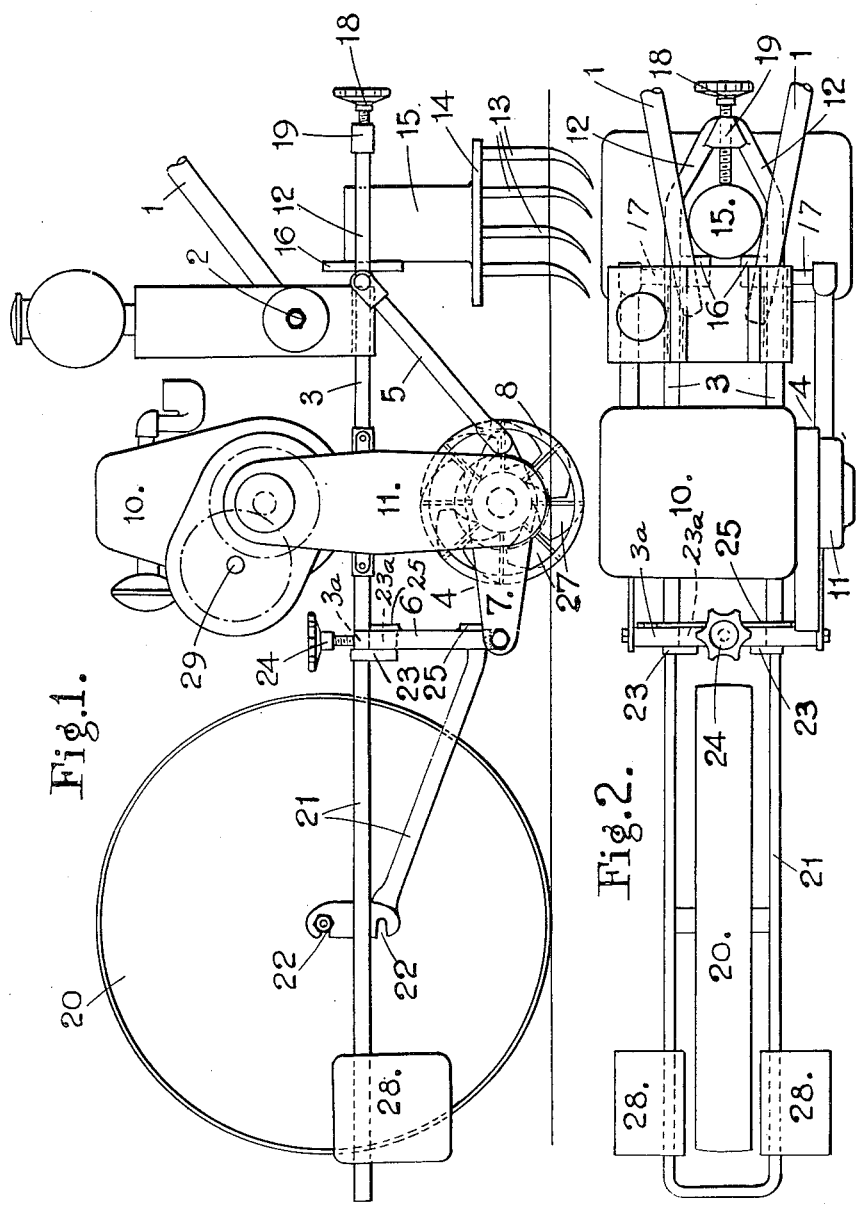
INVENTOR
GEORGE H. F. KNIGHT

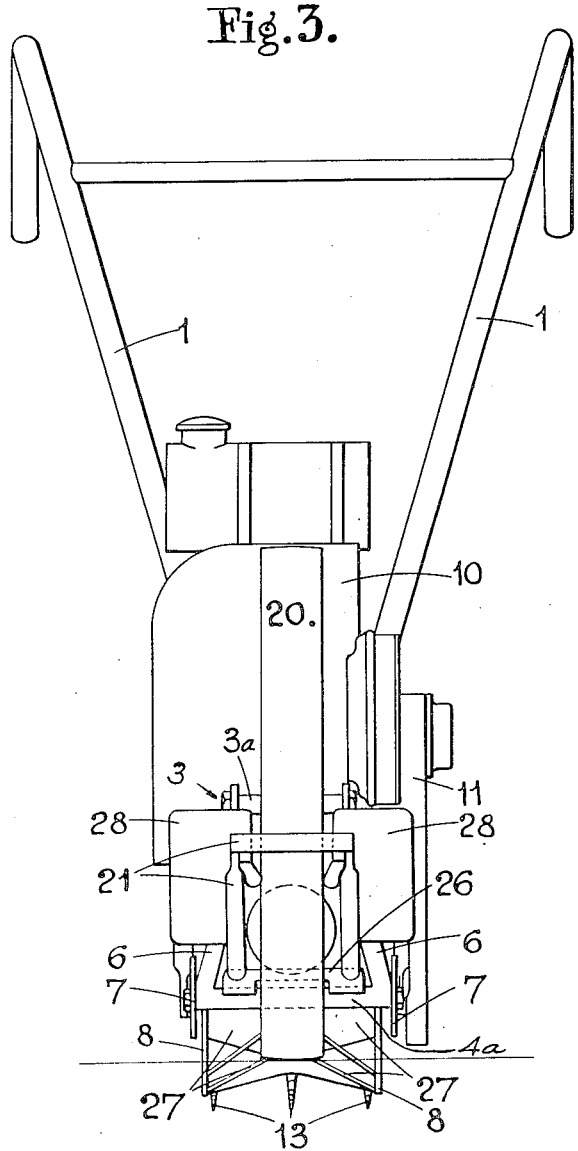

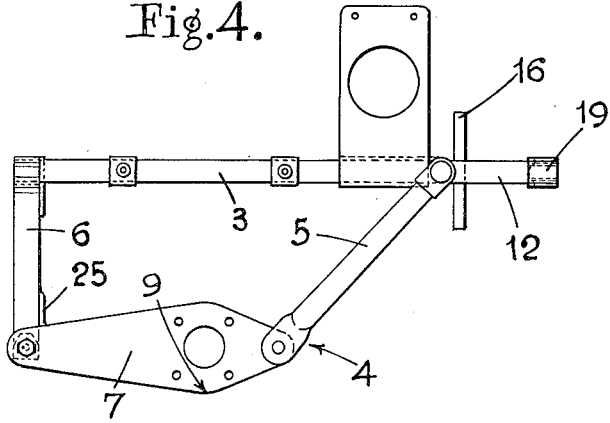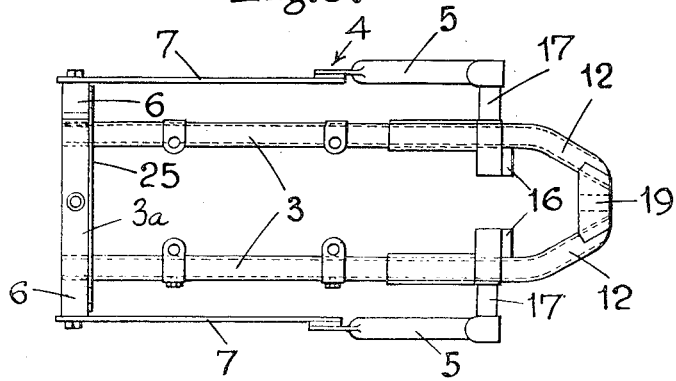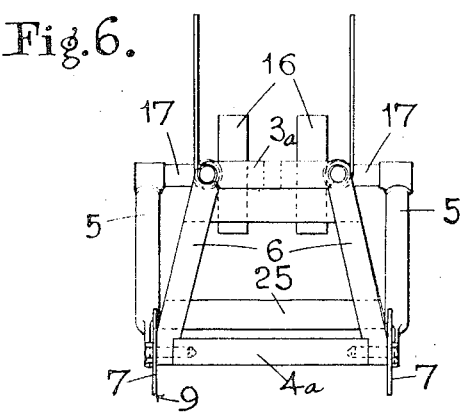

Patented Nov. 14, 1950

2,529,614

UNITED STATES PATENT OFFICE 2,529,614

POWER-DRIVEN AGRICULTURAL AND LIKE IMPLEMENTS

George Hugh Foley Knight, Basingstoke, England

Application October 21, 1947, Serial No. 781,221
In Great Britain September 8, 1943

Section 1, Public Law 690, August 8, 1946
Patent expires September 8, 1963

3 Claims. (Cl. 180—1)

This invention has reference to improvements in multi-purpose power-driven agricultural implements, a description intended to include not only self-propelled machines for working the soil, but also any self-propelled vehicles of the type adapted to transport and/or operate interchangeable horticultural and similar devices (such as tree and crop sprayers, dusters, pumps, turf cutters, mowers, hedge clippers, rollers, and so forth), all of which are adapted to run on farm and garden land, and over soft ground generally. The invention concerns the general construction and arrangement of parts of the vehicles, particularly the main frame, location of power unit, disposition of land wheel or other propulsive land-engaging device, and the principles underlying the interchangeability of agricultural and other implements and devices of the kind hereinbefore described.

Whilst the invention is applicable generally to vehicles of the foregoing description it is especially designed for a comparatively light-duty vehicle suitable for use by farmers, market gardeners, and private or small-holding farmers or gardeners, for operating light ploughs, cultivators, diggers, harrows, hoes, planters, seeders, tedders and the like, as well as the horticultural devices mentioned.

A general object of the invention is to provide improved means whereby a number of different mechanical, agricultural and horticultural implements and devices can be operated with ease, mobility and manoeuvrability at any desired position in the farm or garden under cultivation. A particular object of the invention is to provide a vehicle of the foregoing type which can be turned easily in a comparatively small turning circle, so that if, for intance, the vehicle is being used to propel a plough or a cultivator, it can be readily turned as a whole at the end of a row without the production of comparatively large headlands.

With these and other objects in view a power-driven agricultural or like vehicle according to the invention comprises in combination a central body framework having a rectangular upper framework platform and a rectangular lower framework rigidly joined together, the central body framework being constructed at both its forward and rear ends for the detachable securement thereto respectively of auxiliary frameworks each adapted to support a wheel, implement or the like, a land-engaging propulsive element carried by the said lower framework and a power unit mounted on the upper framework platform of the central body framework, the power unit being disposed substantially over the top of the propulsive element and adapted to drive it through a gear casing mounted on one side of the central body element, and being connected between the power unit and one of a pair of longitudinal carrier plates forming the sides of the lower framework, the power unit having a power take-off coupling whereby it can drive any power-operated implement or device carried by the body framework, and means such as a pair of handles to enable the vehicle to be manipulated by a walking operative.

The land-engaging propulsive element may be a plain or other wheel or wheels, drum, endless track device or equivalent, although there is preferably employed a rotor having strakes or spuds according to the detailed example hereinafter set forth.

Any suitable type of framework may be employed in the construction of the body framework, and for the purpose of light weight compatible with strength it is preferred to adopt a tubular structure. Various methods of detachably securing the front and rear auxiliary frames to the central body are available, but it is advantageous to employ the constructions described later. The means for driving an implement or device from the power unit is fitted because in certain applications of the invention mechanically operated devices as set forth earlier herein may be mounted on the body framework.

In order that the nature of the invention may be clearly understood a description of an embodiment in some detail is hereinafter set forth, merely by way of example, and this is illustrated by the accompanying drawings, wherein:

Figure 1 is a side elevation of the said embodiment of the invention, in diagrammatic outline, with detachable fittings in position adapting the vehicle for use with a tine cultivator;

Figure 2 is a plain view thereof;

Figure 3 is a front elevation thereof; and

Figures 4, 5 and 6 are respectively side elevation, plan, and front elevation of the central body framework.

When applied to a light-duty agricultural implement of the nature hereinbefore described, the body framework of the vehicle is mainly of tubular construction having a central body or main portion as shown in Figures 4–6 and detachable auxiliary forward and rear portions shown attached in the remaining figures. At or near the rear of the central body portion is an upwardly and rearwardly inclined handle or handles 1 for the operator. This handle or handle assembly may be carried by a horizontal hinge-pin 2 (Figures 1 and 2) whereby its angle may be adjusted.

The said central body portion consists of an upper tubular framework platform 3 of general rectangular outline i. e. with longitudinal parallel sides and bridging ends 3a and a lower framework 4 which in plan is also generally rectangular and somewhat larger in outline than the upper platform 3. These two rectangular frameworks are rigidly joined together by tubular corner struts 5 at the rear and bars 6 at the front, the latter diverging from the upper downwards to the lower attachment bar 4a, and the former inclining upwardly and backwardly. Forming the longitudinal sides of the lower framework 4, i. e., running from front to rear, are a pair of vertically disposed plates 7 constituting carrier plates for the axle of a propulsive rotor 8 employed as the land-engaging propulsive unit. These carrier plates are advantageously of elongated diamond-shape as illustrated (see particularly Figure 4), the respective bottom middle corners 9 of the diamonds being located just above ground level, and constituting props or feet to support the vehicle when the tine rotor has been removed for replacement.

Seated on the upper platform 3 is an internal combustion engine 10, and the drive to the rotor 8 is via a gear case 11 located at one side of the central body framework, extending downwardly to the carrier plate 7 of the lower frame 4 on that side. This gear case is a component rigidly fixed between the engine and said carrier plate. A clutch for the rotor drive is incorporated in or on this gear case. The terminal gear of this drive is rotatably mounted in the gear case in such a manner that a square or hexagonal hole is available in its centre for the reception of one end of a quickly detachable live axle for carrying the rotor 8.

The rotor 8 is disposed between the two carrier plates 7 of the lower frame member 4 and is mounted by means of a withdrawable axle or bolt (of square or hexagonal section, or otherwise formed with flats or keys) as shown in my Patent No. 2,473,800, dated June 21, 1949, which passes through one carrier plate, thence through the rotor, and finally through the opposite side plate and into the aforesaid aperture of the driving gear of the gear case. This axle carries the rotor so that axle and rotor rotate together, and the axle is locked against endwise movement in any convenient manner. By this method of mounting, it is only necessary to free and withdraw the axle to enable the rotor to be removed, without affecting the drive. This rotor mounting forms no essential feature of the present invention and further description is considered unnecessary.

The body framework has its rear formed as a rigid extension of the upper platform framework 3. The two side or longitudinal tubes of the upper platform are rearwardly extended at 12 and brought together as a truncated V, forming a substantially open triangular frame inside which means are employed for detachably receiving securing parts of a rear auxiliary framework.

In the example, the auxiliary framework carries a tine cultivator 13, and comprises a base plate 14 from which is erected a cylindrical clamping post 15 which can be inserted through the triangular frame 12, 12 from underneath so as to be adjustable as to height. It lies against the two co-acting parallel and vertical clamping strips 16 carried by the cross-members 17. This makes a rigid linear contact grip for the post 15 when the same is pressed home by the clamping screw 18 passing through the truncated end 19 of the V-shape frame extension 12, 12. A series of vertically aligned holes or recesses may be formed along the post 15 to enable the screw 18 to have positive positional engagement with the post.

The forward auxiliary framework 21 is a unit capable of being detached from the central body framework by any suitable means. Said forward framework 21 may be an integral part of an interchangeable implement or other device (e. g. a land wheel 20 as illustrated), or it may detachably carry the same. In a form adapted to carry a leading land wheel as for instance when the cultivator 13 (or a plough) is being supported by the rear extension 12, 16, 18, 19, the forward framework comprises two vertical sides of triangular shape as seen in Figure 1 of tubular frames which extend from a transverse attachment end. The apices of the triangular side frames lead to and are slotted at 22 to receive the wheel axle.

The transverse attachment end comprises a pair of strips 23 carrying a central block 23a or check adapted to sit underneath the forward cross element 3a of the upper framework platform 3. This block has an upper hole or recess for engagement by the clamping screw 24. At the foot of the said transverse attachment end there is a hook ledge 26 (or a plurality of separate hooks), seen in Figure 3. The part 25 is a stop bar which bridges the lower ends of the inclined corner bars 6 and there is a similar bar which bridges the tops of the corner bars 6. The attachment bar 4a spans the actual lower ends of the bars 6. The stop bars 25 limit movement of the block 23a and the hook ledge 26 towards the center part of the machine.

As mentioned earlier in this specification, it is preferred to employ a propulsive rotor 8 to secure locomotion, said rotor being driven by the internal combustion engine 10 via the gear case 11 previously described. The rotor forms a rotary land-engaging element, and comprises a power-driven hub or other rotor from which extend a series of spuds or strakes 27 designed to grip the ground and to propel the vehicle by the backward pressure of the spuds in the ground during the rotation of the rotor.

To illustrate the manoeuvrability of the vehicle, it will be assumed that a cultivator 13 has been fitted to the rear section of the body framework, and a land wheel 20 to the forward end as illustrated. The vehicle is driven by letting in the clutch of the rotor drive, and the operator, grasping the handles 1, directs the implement over the land. The bulk of the weight is on the central body framework, and the engine, perched above the rotor provides the necessary weight for penetration of the spuds 27 and their propulsive grip in the soil, also keeping the cultivator 13 (or it may be a plough share or other device) down to its work. This can be aided by adjustable weights 28 which can be used to alter the centre of gravity of the vehicle as a whole when necessary, as with turning. At the turn, the vehicle is lifted, pivoting on the front land wheel (wheelbarrow fashion) and can be completely turned in a small compass about the land wheel as a fulcrum. When an adjustable weight is used, this would be moved in a direction from the central part of the main frame towards the fulcrum thus relieving the operator of much weight. The arrangement depicted is one where the weights 28 are moved to the other side of the fulcrum (i. e. in the position illustrated), thus giving a mechanical advantage as a counterbalance.

At any suitable part of the engine, preferably on the outside of the gear box or casing as at 29, there is provided a power take-off coupling element to receive a chain wheel, pulley, flexible or other shaft or the like for driving hedgecutters, a pump, or other device which would be detachably secured to the central body framework by means of an attachable forward auxiliary framework similar to the one illustrated with the landwheel 20.

I claim:

1. An automotive agricultural land vehicle comprising an elongated upper horizontal frame, a lower horizontal frame beneath and shorter than the upper frame, said lower frame being disposed between the ends of the upper frame, struts rigidly connecting said frames together, a land supporting wheel mounted on one end of the upper frame, means for attaching an agricultural tool to the other end of the upper frame, a propulsion wheel substantially smaller than said land supporting wheel rotatably mounted on the lower frame, said propulsion wheel having on its periphery ground gripping means, a motor of substantial weight secured to the upper frame directly above the propulsion wheel so that substantially all its weight is effective to urge said propulsion wheel against the ground, and a train of gears connecting said motor to said propulsion wheel.

2. An automotive agricultural land vehicle comprising an elongated upper horizontal frame, a lower horizontal frame beneath and shorter than the upper frame, said lower frame being disposed between the ends of the upper frame, struts rigidly connecting said frames together, a land supporting wheel mounted on one end of the upper frame, means for attaching an agricultural tool to the other end of the upper frame, said propulsion wheel having on its periphery ground gripping means, a motor of substantial weight secured to the upper frame directly above the propulsion wheel so that substantially all its weight is effective to urge said propulsion wheel against the ground, a train of gears connecting said motor to said propulsion wheel and counterbalancing weights slidably mounted on said upper frame adjacent the land supporting wheel.

3. An automotive agricultural land vehicle comprising an upper horizontal frame, a lower horizontal frame beneath the upper frame, struts rigidly connecting said frames together, a forward frame member removably secured to said upper and lower frames, a land supporting wheel mounted on said forward frame member, a propulsion wheel substantially smaller than the land supporting wheel rotatably mounted on the lower frame, said propulsion wheel having on its periphery ground gripping means, a motor of substantial weight secured to the upper frame directly above the propulsion wheel so that substantially all its weight is effective to urge said propulsion wheel against the ground and a train of gears from said motor to said propulsion wheel.

GEORGE HUGH FOLEY KNIGHT.

REFERENCES CITED

The following references are of record in the file of this patent:

UNITED STATES PATENTS

| Number | Name | Date |
|---|---|---|
| 1,366,020 | Nobbs | Jan. 18, 1921 |
| 1,880,023 | Nobbs | Sept. 27, 1932 |
| 2,256,583 | Squires | Sept. 23, 1941 |

FOREIGN PATENTS

| Number | Country | Date |
|---|---|---|
| 512,817 | France | Oct. 23, 1920 |